(12) United States Patent
Yoshii et al.

(10) Patent No.: US 8,787,268 B2
(45) Date of Patent: Jul. 22, 2014

(54) RADIO COMMUNICATION BASE STATION DEVICE, RADIO COMMUNICATION TERMINAL DEVICE, AND RADIO COMMUNICATION METHOD

(75) Inventors: Isamu Yoshii, Kanagawa (JP); Atsushi Sumasu, Kanagawa (JP); Katsuhiko Hiramatsu, Leuven (BE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 825 days.

(21) Appl. No.: 12/668,151

(22) PCT Filed: Jul. 9, 2008

(86) PCT No.: PCT/JP2008/001832
§ 371 (c)(1),
(2), (4) Date: Jan. 7, 2010

(87) PCT Pub. No.: WO2009/008165
PCT Pub. Date: Jan. 15, 2009

(65) Prior Publication Data
US 2010/0296461 A1 Nov. 25, 2010

(30) Foreign Application Priority Data
Jul. 10, 2007 (JP) .................. 2007-181356

(51) Int. Cl.
*H04W 4/00* (2009.01)
*H04W 72/00* (2009.01)
*H04L 5/00* (2006.01)
*H04J 11/00* (2006.01)
*H04W 72/04* (2009.01)

(52) U.S. Cl.
CPC ............. *H04L 5/0007* (2013.01); *H04W 72/04* (2013.01); *H04J 11/005* (2013.01); *H04L 5/0037* (2013.01); *H04L 5/0044* (2013.01); *H04L 5/0062* (2013.01)
USPC ........................................... 370/329; 455/454

(58) Field of Classification Search
USPC ................... 370/329; 455/426, 522, 552, 454
See application file for complete search history.

(56) References Cited

U.S. PATENT DOCUMENTS 5,983,101 A * 11/1999 Billstrom .................. 455/452.2
2004/0121740 A1    6/2004 Miyano
2006/0203709 A1*  9/2006 Laroia et al. ................. 370/208

FOREIGN PATENT DOCUMENTS

JP    2001-203625    7/2001
JP    2003-318793    11/2003

OTHER PUBLICATIONS

International Search Report dated Sep. 30, 2008.
E. Costa, et al., "Duplex arrangement for future broadband radio interfaces," IST-2003-507581 Winner, D2.5 v1.1, Oct. 2004, pp. 1-121.

* cited by examiner

*Primary Examiner* — Afshawn Towfighi
(74) *Attorney, Agent, or Firm* — Dickinson Wright PLLC (57) ABSTRACT

Disclosed are a radio communication base station device, a radio communication terminal device, and a radio communication method which can reduce interference between adjacent resource blocks even when the DL timing is overlapped with the UL timing at the boundary between an independent allocation band and a cooperation allocation band. When a terminal A is allocated for a UL resource block of the cooperation allocation band serving as a band boundary with the independent allocation band, in ST301, a terminal A transmits a horizontally polarized wave signal to respective terminals B to D, and in ST302, a base station (100) transmits a vertically polarized signal to respective terminals A to D. In ST303, the terminals B to D measure XPD of the received vertically polarized signal and the horizontally polarized signal. In ST304, the terminals B to D transmit the XPD report value to the base station (100). ST305 selects the terminal which has transmitted the largest XPD report value among the XPD report values transmitted from the terminals B to D and allocates the selected terminal to the DL resource block at the band boundary.

7 Claims, 9 Drawing Sheets

RADIO COMMUNICATION BASE STATION DEVICE, RADIO COMMUNICATION TERMINAL DEVICE, AND RADIO COMMUNICATION METHOD

TECHNICAL FIELD

The present invention relates to a wireless communication base station apparatus, wireless communication terminal apparatus and wireless communication method.

BACKGROUND ART

Figure 1:
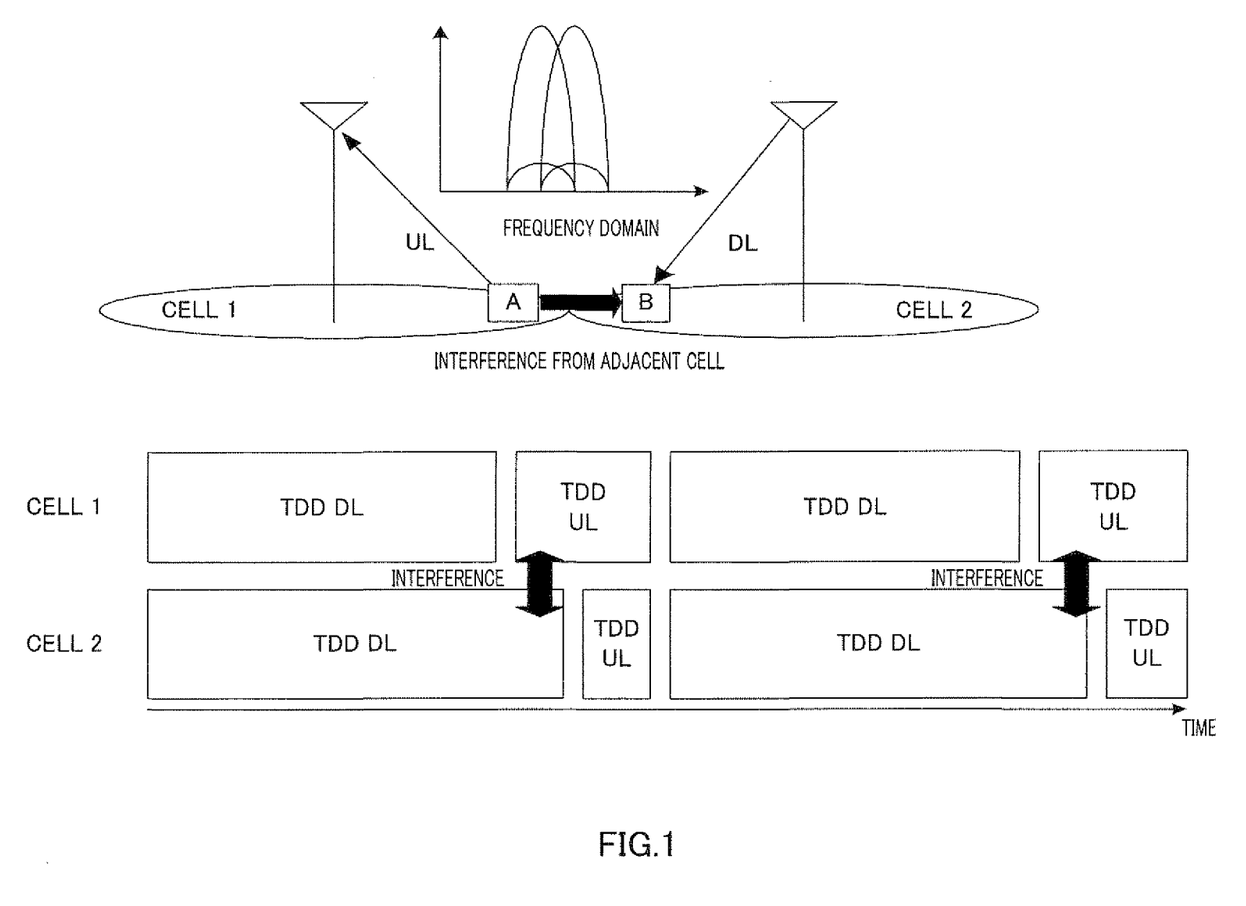
FIG. 1 illustrates a state where interference is caused.

In TDD (Time Division Duplex), if DL (DownLink) and UL (UpLink) are allocated independently between cells, for example, as shown in FIG. 1, the timing at which UL is allocated to wireless communication terminal apparatus (hereinafter simply "terminal") A belonging to cell 1, may overlap the timing at which DL is allocated to terminal B belonging to cell 2.

In this case, terminal B in cell 2 is subject to severe interference from terminal A in cell 1 (adjacent cell), and may not be able to decode a DL signal. This is apparent especially when terminal A and terminal B are located near their cell edges.

Figure 2:
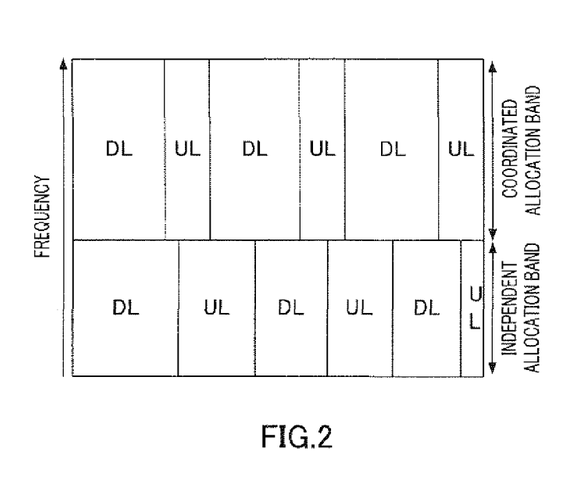
FIG. 2 illustrates an independent allocation band and coordinated allocation band.
Figure 3:
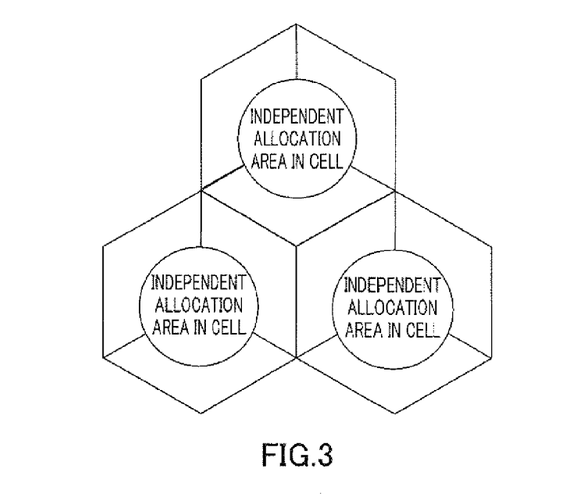
FIG. 3 illustrates an independent allocation band and coordinated allocation band.

Therefore, as shown in FIG. 2 and FIG. 3, there is a known technique of providing a frequency band in which DL and UL are allocated independently (i.e. independent allocation band) in the cell center area in a cell, and providing a frequency band in which DL and UL are allocated in a coordinated manner between adjacent cells (i.e. coordinated allocation band) in the cell periphery area not including the cell center area in the cell. By this means, it is possible to avoid interference caused between the cells shown in FIG. 1.

Non-Patent Document 1: IST-2003-507581 WINNER D2.5 V1.1 "Duplex arrangements for future broadband radio interfaces"

DISCLOSURE OF INVENTION

Problems to be Solved by the Invention

Figure 4:
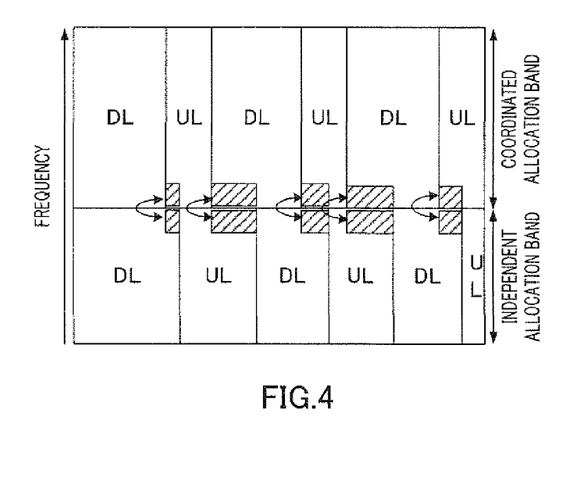
FIG. 4 shows interference that is caused in the band boundary between an independent allocation band and a coordinated allocation band.

However, in the method of providing an independent allocation band and coordinated allocation band, a guard band is not provided between these bands, and, as a result, as shown in FIG. 4, interference is caused between adjacent carriers in the hatching areas in which the timings of DL and UL overlap, that is, between adjacent resource blocks.

It is therefore an object of the present invention to provide a wireless communication base station apparatus, wireless communication terminal apparatus and wireless communication method that can reduce interference between adjacent resource blocks even when the timings of DL and UL overlap in the band boundary between an independent allocation band and a coordinated allocation hand.

Means for Solving the Problem

The wireless communication base station apparatus of the present invention employs a configuration having: a cross polarization discrimination acquiring section that acquires cross polarization discriminations, which are measured and transmitted in first wireless communication terminal apparatuses, between signals transmitted from a second wireless communication terminal apparatus belonging to an adjacent cell to the first wireless communication terminal apparatuses and signals transmitted from the wireless communication base station apparatus to the first wireless communication terminal apparatuses; and an allocating section that allocates a first wireless communication terminal apparatus, from which the highest cross polarization discrimination is acquired, to a downlink resource block, and that allocates the second wireless communication terminal apparatus to an uplink resource block, in adjacent resource blocks forming a band boundary between an independent allocation band, in which a frequency band allocating a resource block independently between cells is provided, and a coordinated allocation band, in which a frequency band allocating a resource block in a coordinated manner between adjacent cells is provided.

The wireless communication terminal apparatus of the present invention employs a configuration having: a cross polarization discrimination measuring section that measures a cross polarization discrimination between a signal transmitted from a different wireless communication terminal apparatus belonging to an adjacent cell and a signal transmitted from a wireless communication base station apparatus; and a transmitting section that transmits the measured cross polarization discrimination to the wireless communication base station apparatus.

The wireless communication method of the present invention includes: a cross polarization discrimination measuring step of, in first wireless communication terminal apparatuses, measuring cross polarization discriminations between signals transmitted from a second wireless communication terminal apparatus belonging to an adjacent cell to the first wireless communication terminal apparatuses and signals transmitted from a wireless communication base station apparatus to the first wireless communication terminal apparatuses; a transmitting step of transmitting the measured cross polarization discriminations from the first wireless communication terminal apparatuses to the wireless communication base station apparatus; and an allocating step of, in the wireless communication base station apparatus, allocating a first wireless communication terminal apparatus providing the highest cross polarization among the cross polarization discriminations transmitted from the first wireless communication terminal apparatuses, to a downlink resource block, and allocating the second wireless communication terminal apparatus to an uplink resource block, in adjacent resource blocks forming a band boundary between an independent allocation band, in which a frequency band allocating a resource block independently between cells is provided, and a coordinated allocation band, in which a frequency band allocating a resource block in a coordinated manner between adjacent cells is provided.

Advantageous Effect of Invention

According to the present invention, it is possible to reduce interference between adjacent resource blocks even when the timings of DL and UL overlap in the band boundary between an independent allocation band and a coordinated allocation band.

BEST MODE FOR CARRYING OUT THE INVENTION

Embodiments of the present invention will be explained below in detail with reference to the accompanying drawings. Also, in the embodiments, the same components will be assigned the same reference numerals and overlapping explanation will be omitted.

Embodiment 1

The configuration of wireless communication base station apparatus (hereinafter "base station") 100 according to the present embodiment of the present invention will be explained using FIG. 5. First, the transmitting side will be explained. Modulating section 101 modulates a pilot signal and outputs the modulated pilot signal to IFFT section 103.

Modulating section 102 modulates data and outputs the modulated data to IFFT section 103. IFFT section 103 performs IFFT (Inverse Fast Fourier Transform) processing on the pilot signal outputted form modulating section 101 and the data outputted from modulating section 102, and outputs these signals subjected to IFFT processing to RF transmitting section 104.

RF transmitting section 104 performs predetermined transmission processing such as D/A conversion and up-conversion on the signals outputted from IFFT section 103, and transmits by radio the signals subjected to transmission processing from antenna 105 using the vertical polarized wave.

Next, the receiving side will be explained. RF receiving section 106 performs predetermined reception processing such as down-conversion and A/D conversion on a signal received via antenna 105, and outputs the signal subjected to reception processing to FFT section 107.

FFT section 107 performs FFT (Fast Fourier Transform) processing on the signal outputted from RF receiving section 106, and outputs the signal subjected to FFT processing to XPD report value decoding section 108.

XPD report value decoding section 108 decodes the cross polarization discrimination ("XPD") report value transmitted from each terminal based on a signal outputted from FFT section 107, and outputs the decoded XPD report values to allocation determining section 109.

Here, XPD is an index indicating the magnitude of interference between the vertical polarized wave and the horizontal polarized wave, and, if this value is low, it is understood that the orthogonality between the vertical polarized wave and the horizontal polarized wave is poor and that channel quality is degraded. By contrast, if this value is high, it is understood that the orthogonality between the vertical polarized wave and the horizontal polarized wave is good and that channel quality is not degraded.

Allocation determining section 109 allocates the terminal having transmitted the highest XPD report value among the XPD report values of terminals outputted from XPD report value decoding section 108, to the DL resource block in the band boundary between the independent allocation band and the coordinated allocation band.

Figure 6:
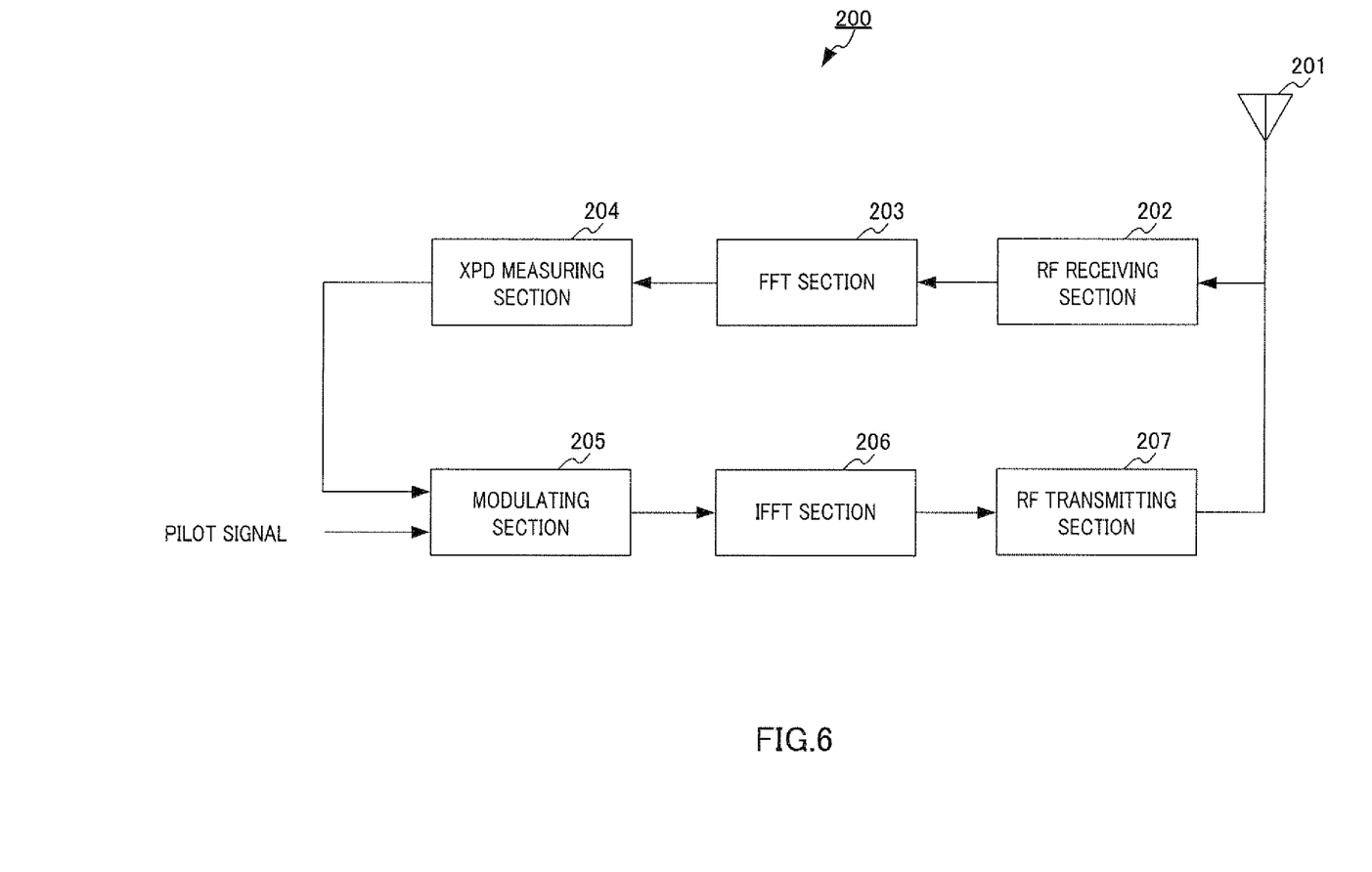
FIG. 6 is a block diagram showing the configuration of a wireless communication terminal apparatus according to Embodiments 1 and 2 of the present invention.

Next, the configuration of wireless communication terminal apparatus (hereinafter "terminal") 200 according to Embodiment 1 of the present invention will be explained using FIG. 6. RF receiving section 202 performs predetermined reception processing such as down-conversion and A/D conversion on a signal received via antenna 201, and outputs the signal subjected to reception processing to FFT section 203.

FFT section 203 performs FFT (Fast Fourier Transform) processing on the signal outputted from reception processing section 202, and outputs the signal subjected to FFT processing to XPD measuring section 204.

XPD measuring section 204 measures XPD between a horizontal polarized wave signal transmitted from another terminal (belonging to an adjacent cell) and a vertical polarized wave signal transmitted from base station 100, based on the signal outputted from FFT section 203, and outputs the XPD report value indicating the measurement result to modulating section 205.

Modulating section 205 modulates the XPD report value outputted from XPD measuring section 204 or a pilot signal, and outputs the modulated XPD report value or pilot signal to IFFT section 206.

IFFT section 206 performs IFFT (Inverse Fast Fourier Transform) processing on the XPD report value or pilot signal outputted from modulating section 205, and outputs the signal subjected to IFFT processing to RF transmitting section 207.

RF transmitting section 207 performs predetermined transmission processing such as D/A conversion and up-conversion on the signal outputted from IFFT section 206, and transmits by radio the signal subjected to transmission processing from antenna 201 using the horizontal polarized wave.

Figure 5:
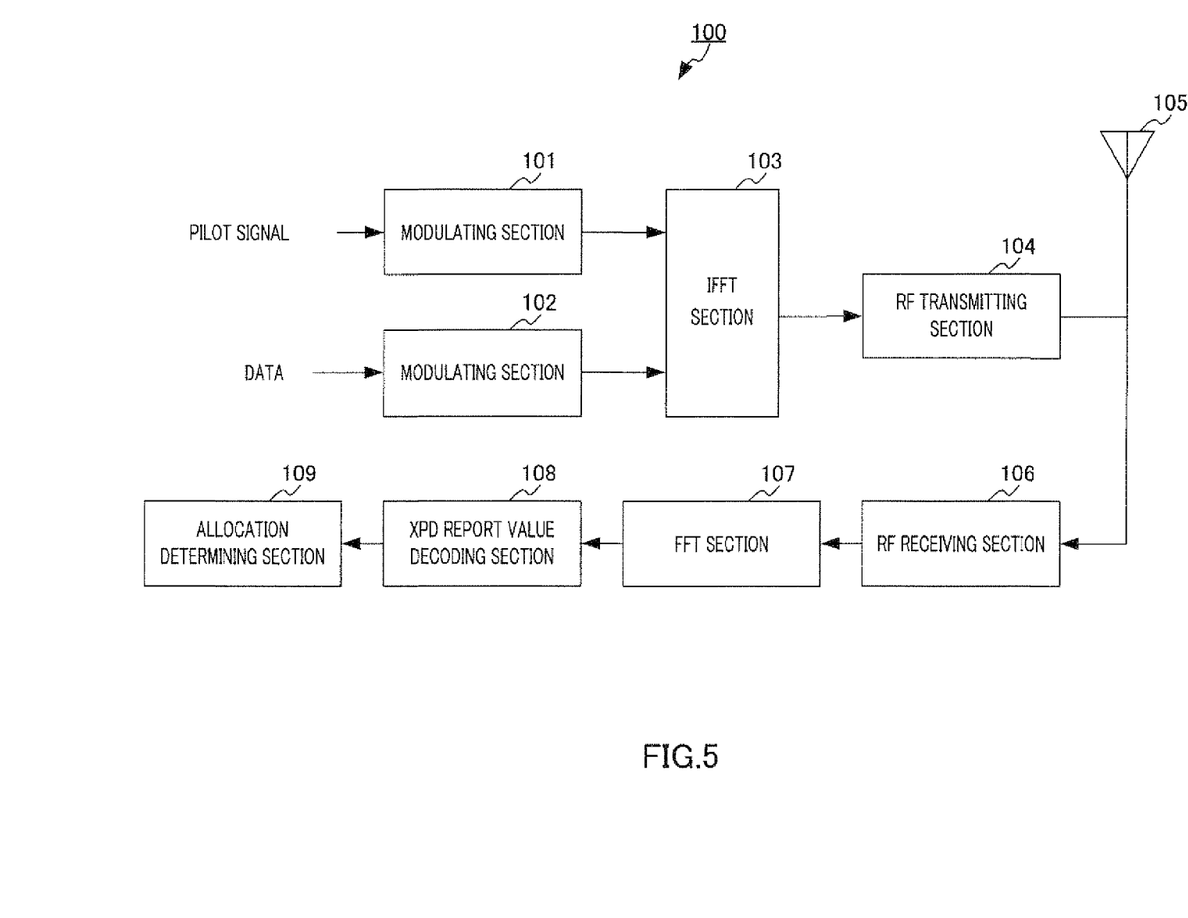
FIG. 5 is a block diagram showing the configuration of a wireless communication base station apparatus according to Embodiment 1 of the present invention.

Next, the steps of communication processing between base station 100 shown in FIG. 5 and terminal 200 (expressed as "terminals A to D" in this case) shown in. FIG. 6, will be explained using FIG. 7. Here, as shown in FIG. 8, a case will be explained where terminal A is allocated to a UL resource block of the coordinated allocation band forming the band boundary with the independent allocation band, and where one of terminals B to D is selected to allocate to a DL resource block of the independent allocation band forming the band boundary with the coordinated allocation band.

Figure 7:
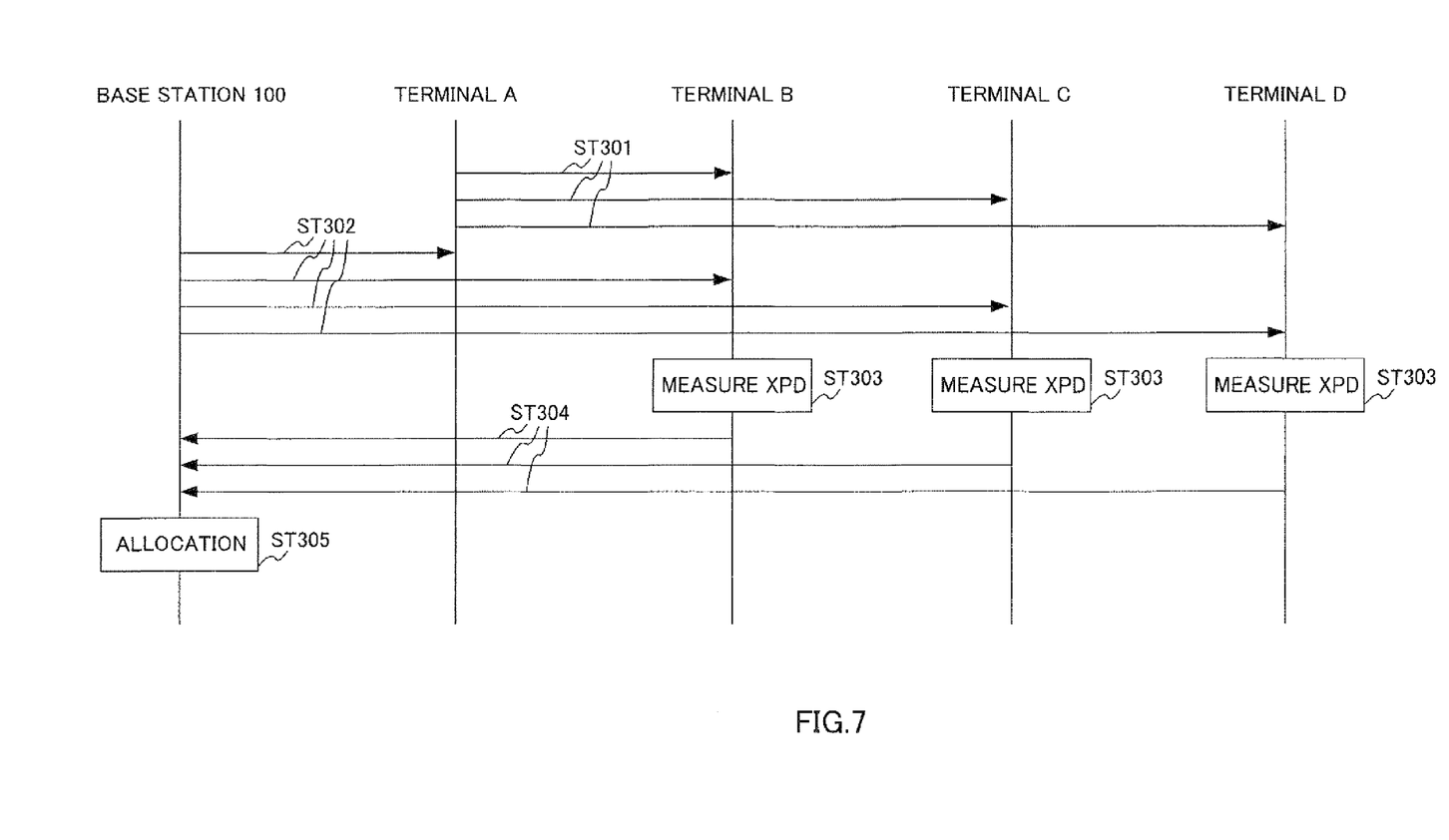
FIG. 7 is a sequence diagram showing the steps of communication process between the base station shown in FIG. 5 and the terminal shown in FIG. 6.
Figure 8:
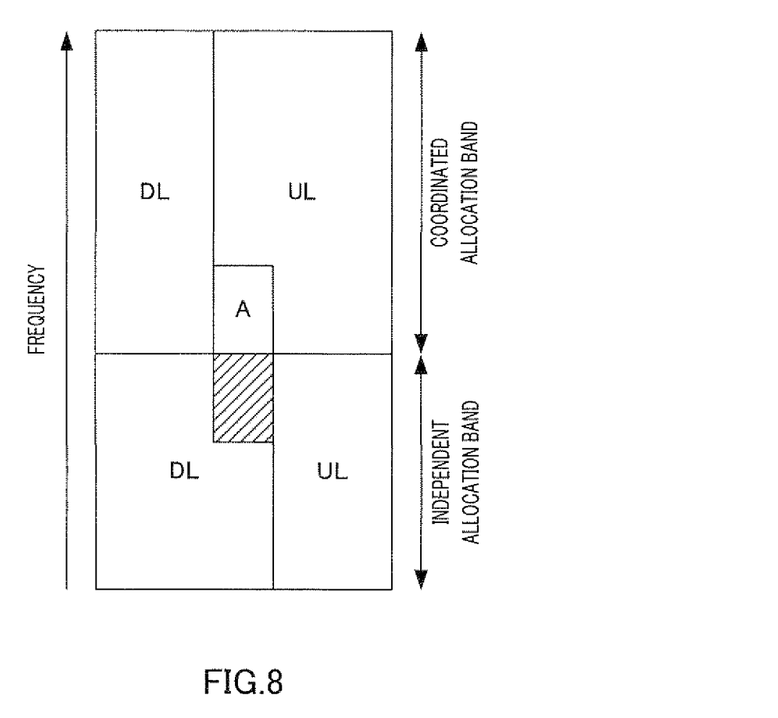
FIG. 8 illustrates a state where terminals are allocated to a DL resource block and UL resource block in adjacent resource blocks forming the band boundary between an independent allocation band and a coordinated allocation band.

In FIG. 7, in step (hereinafter abbreviated to "ST") 301, terminal A transmits horizontal polarized wave signals to terminals B to D, and, in ST 302, base station 100 transmits vertical polarized wave signals to terminals A to D.

In ST 303, terminals B to D measure XPD between received vertical polarized wave signals and received horizontal polarized wave signals, and, in ST 304, terminals B to D transmit the XPD measurement results (i.e. XPD report values) to base station 100.

Figure 9:
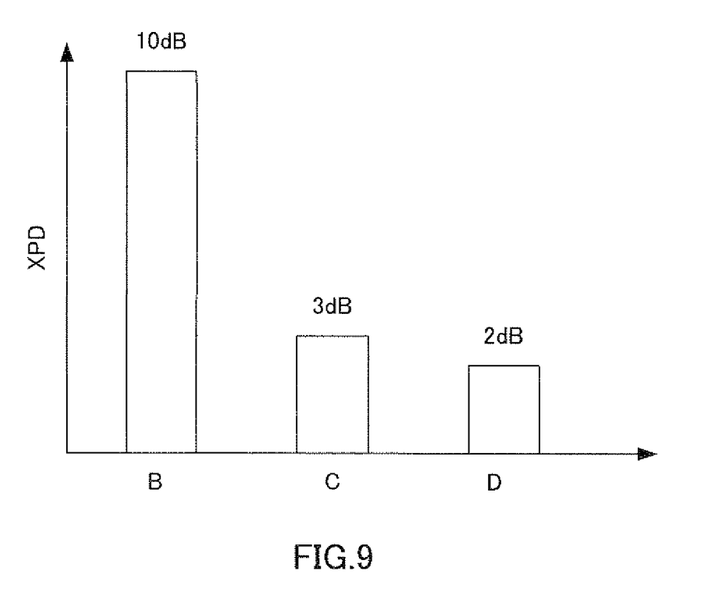
FIG. 9 shows XPD report values on a per terminal basis.

In ST 305, the terminal having transmitted the highest XPD report value among the XPD report values transmitted from terminals B to D, is selected. For example, if the XPD report values transmitted from terminals B to D are as shown in FIG. 9, that is, if the XPD report value from terminal B is 10 dB, the XPD report value from terminal C is 3 dB and the XPD report value from terminal D is 2 dB, terminal B is selected. The selected terminal is allocated to the DL resource block in the band boundary.

Thus, according to Embodiment 1, to resource blocks adjacent to the independent allocation band to which one of DL and UL is allocated and the coordinated allocation band to which the other is allocated, by allocating a terminal to which UL is allocated and the terminal providing XPD, which is higher than other XPD, between a horizontal polarized wave signal transmitted from that terminal and a vertical polarized wave signal transmitted from a base station, it is possible to reduce interference between adjacent cells in these terminals.

Embodiment 2

Figure 10:
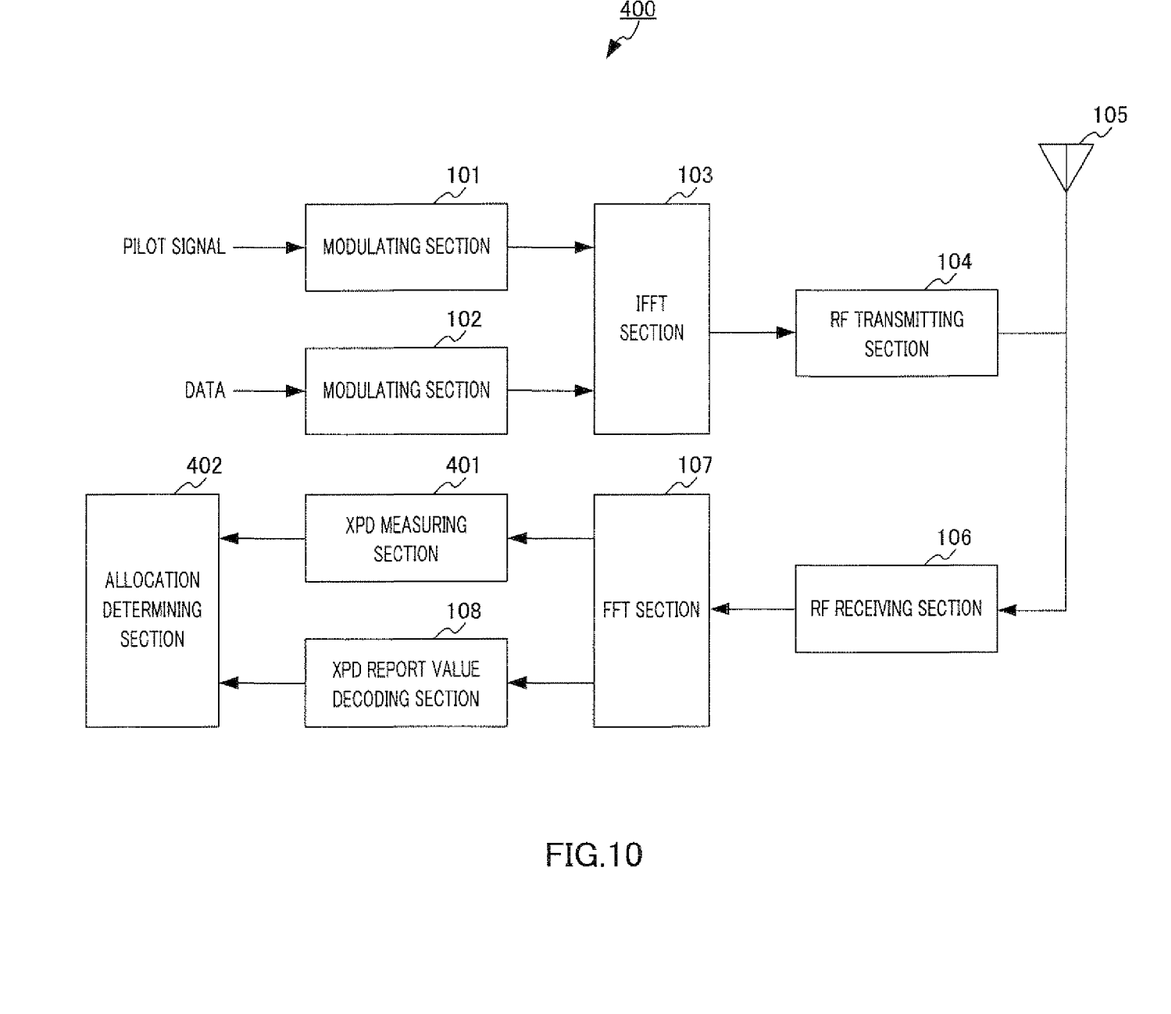
FIG. 10 is a block diagram showing the configuration of a wireless communication base station apparatus according to Embodiment 2 of the present invention.

The configuration of base station 400 according to Embodiment 2 of the present invention will be explained using FIG. 10. Here, FIG. 10 differs from FIG. 5 in adding XPD measuring section 401 and replacing allocation determining section 109 with allocation determining section 402.

XPD measuring section 401 measures XPD between horizontal polarized wave signals transmitted from terminals and vertical polarized wave signals transmitted from the base station, based on signals outputted from FFT section 107, and outputs the measurement results to allocation determining section 402.

Allocation determining section 402 adds the XPD measurement results outputted from XPD measuring section 401 and the XPD report values of the terminals outputted from XPD report value decoding section 108, on a per terminal basis, and allocates the terminal having the highest addition result of XPD, to DL and UL resource blocks in adjacent resource blocks forming the band boundary between the independent allocation band and the coordinated allocation band.

The configuration of a terminal according to Embodiment 2 of the present invention is similar to the configuration shown in FIG. 6 of Embodiment 1 and differs from that configuration in part of the functions, and, consequently, the different functions will be explained using FIG. 6.

XPD measuring section 204 measures XPD between a horizontal polarized wave signal transmitted from that terminal and a vertical polarized wave signal transmitted from a base station, based on a signal outputted from FFT section 203, and outputs a XPD report value indicating the measurement result to modulating section 205.

The steps of communication processing between base station 400 and terminal 200 according to Embodiment 2 of the present invention will be explained using FIG. 11. Here, as shown in FIG. 12, a ease will be explained where an identical terminal is allocated to DL and UL resource blocks in adjacent resource blocks forming the band boundary between the independent allocation band and the coordinated allocation band.

Figure 11:
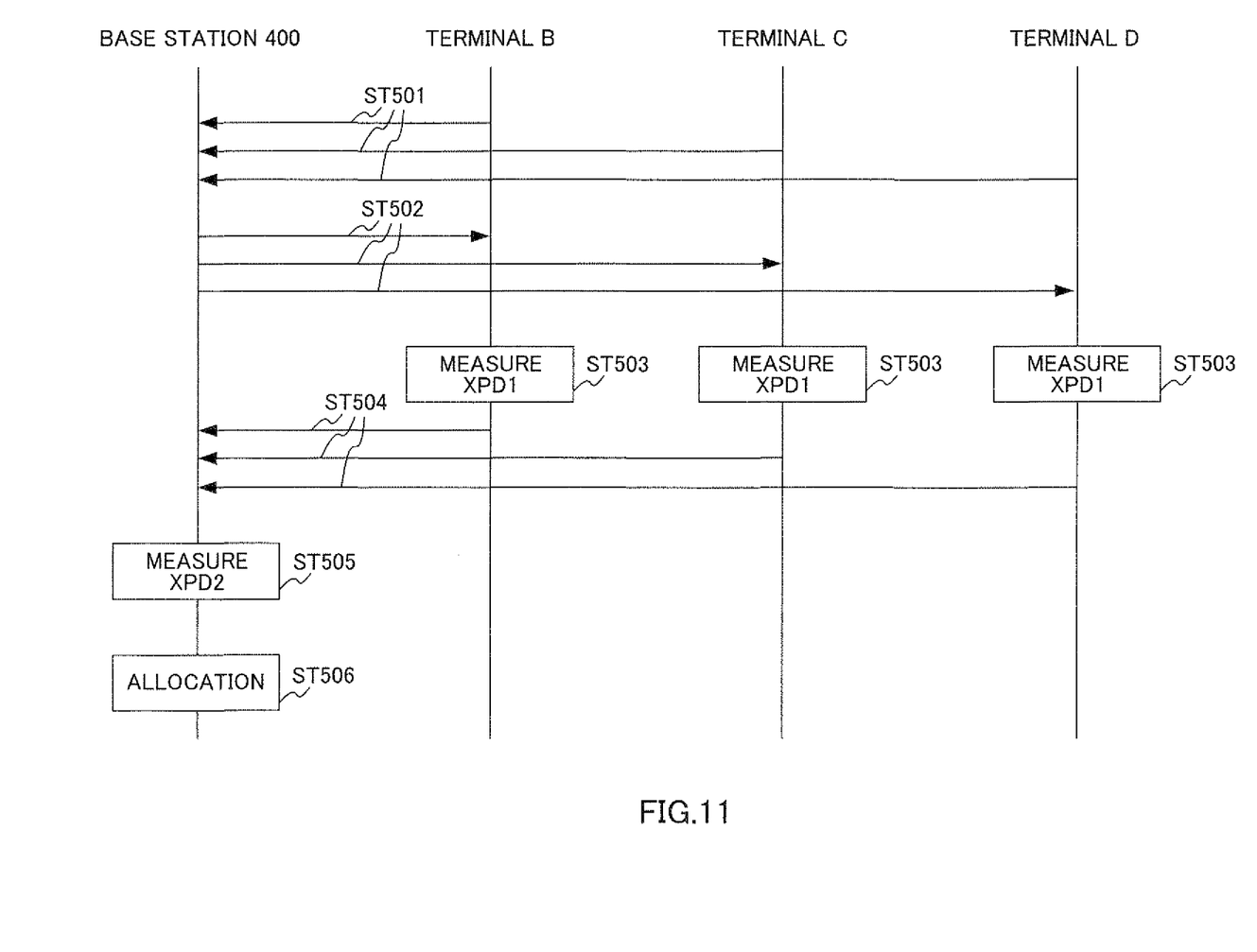
FIG. 11 is a sequence diagram showing the steps of communication process between a wireless communication base station apparatus and wireless communication terminal apparatus according to Embodiment 2 of the present invention.
Figure 12:
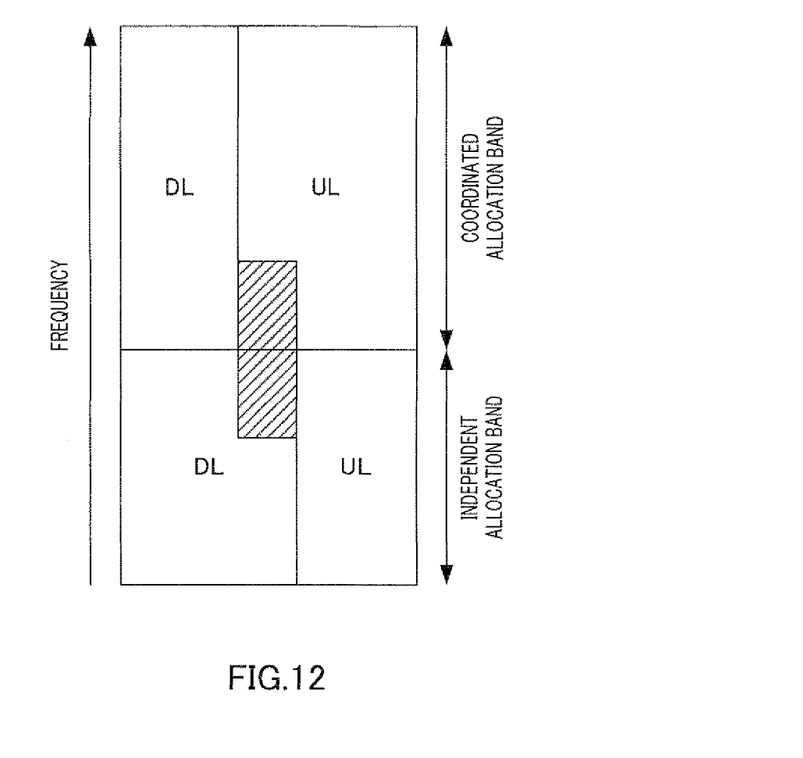
FIG. 12 illustrates a state where a terminal is allocated to a DL resource block and UL resource block in adjacent resource blocks forming the band boundary between an independent allocation band and a coordinated allocation band.

In FIG. 11, in ST 501, terminals B to D transmit horizontal polarized wave signals to the base station, and, in ST 502, the base station transmits vertical polarized wave signals to terminals B to D.

In ST 503, terminals B to D, measure XPD 1 between vertical polarized wave signals received individually and horizontal polarized wave signals transmitted from that terminal, and, in ST 504, terminals B to D transmit XPD 1 measurement results (i.e. XPD report values) to the base station.

Figure 13:
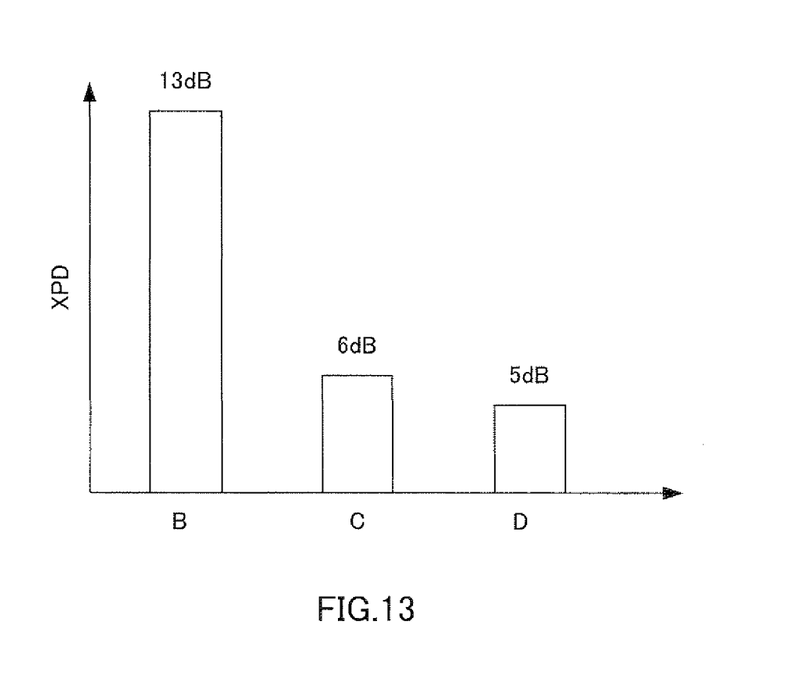
FIG. 13 shows XPD addition results on a per terminal basis.

In ST 505, the base station measures XPD 2 between horizontal polarized wave signals received from terminals B to D and vertical polarized wave signals transmitted from that base station, and adds the XPD 1 measurement results and the XPD 2 measurement results on a per terminal basis. As a result, for example, as shown in FIG. 13, when the XPD addition result in terminal B is 13 dB, the XPD addition result in terminal C is 6 dB and the XPD addition result in terminal D is 5 dB, in ST 506, terminal B is allocated to DL and UL resource blocks in adjacent blocks forming the band boundary.

Thus, according to Embodiment 2, in the case of allocating an identical terminal to DL and UL resource blocks in adjacent resource blocks forming the band boundary between the independent allocation band and the coordinated allocation band, terminals measures XPD between vertical polarized wave signals transmitted from a base station and horizontal polarized wave signals transmitted from those terminals, and the base station measures XPD between horizontal polarized wave signals transmitted from those terminals and vertical polarized wave signals transmitted from that base station, adds XPD measured in those terminals and XPD measured in the base station on a per terminal basis and allocates the terminal having the highest added XPD, thereby reducing interference in the terminal.

Also, although cases have been described above with embodiments where a terminal transmits a horizontal polarized wave signal and a base station transmits a vertical polarized wave signal, the present invention is not limited to this, and it is equally possible to use any polarized wave signals as long as a terminal and base station transmit polarized wave signals that are orthogonal to each other.

Although a case has been described above with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Also, in the above embodiments, a base station may be referred to as "Node B," and a terminal may be referred to as "UE."

The disclosure of Japanese Patent Application No. 2007-181356, filed on Jul. 10, 2007, including the specification, drawings and abstract, is incorporated herein by reference in its entirety.

INDUSTRIAL APPLICABILITY

The wireless communication base station apparatus, wireless communication terminal apparatus and wireless communication method according to the present invention are applicable to, for example, a mobile communication system.

The invention claimed is:

1. A base station apparatus comprising:
a cross polarization discrimination acquiring section configured to acquire a first cross polarization discrimination, transmitted from a second terminal apparatus, between a first polarization of a signal transmitted from a first terminal apparatus to the second terminal apparatus and a second polarization of a signal transmitted from the base station apparatus to the second terminal apparatus; and
an allocating section configured to allocate, based on the acquired first cross-polarization discrimination, the second terminal apparatus to a first resource block that is included in an independent allocation band and that is allocated for one of a downlink and an uplink, the first resource block being adjacent to a second resource block that is included in a coordinated allocation band and that is allocated for the other one of the downlink and the uplink,
wherein the independent allocation band is a frequency band in which the first resource block is allocated independently from an adjacent cell and the coordinated allocation band is a frequency band in which the second resource block is allocated coordinately with the adjacent cell.

2. The base station apparatus according to claim 1, wherein the allocating section allocates the first terminal apparatus to the second resource block included in the coordinated allocation band.

3. The base station apparatus according to claim 1, wherein the cross polarization discrimination acquiring section acquires cross polarization discriminations transmitted from a plurality of second terminal apparatuses and the allocating section allocates the second terminal apparatus from which the highest cross polarization discrimination is acquired, to the first resource block included in the independent allocation band.

4. The base station apparatus according to claim 1, further comprising:
a cross polarization discrimination measuring section configured to measure second cross polarization discriminations between third polarizations of signals transmitted from terminal apparatuses to the base station apparatus and the second polarization of the signal transmitted from the base station apparatus to the terminal apparatuses, wherein:

the cross polarization discrimination acquiring section acquires third cross polarization discriminations between the third polarizations of the signals transmitted from the terminal apparatuses to the base station apparatus and the second polarization of the signal transmitted from the base station apparatus to the terminal apparatuses, the third cross polarization discriminations being measured and transmitted by the terminal apparatuses, and the allocating section allocates a third terminal apparatus providing the highest addition result of one of the measured second cross polarization discriminations and one of the acquired third cross polarization discriminations, to the first resource block and the second resource block included in the independent allocation band and the coordinated allocation band.

5. The second terminal apparatus according to claim 1, comprising:
a cross polarization discrimination measuring section configured to measure the first cross polarization discrimination between the first polarization of the signal transmitted from the first terminal to the second terminal apparatus and the second polarization of the signal transmitted from the base station apparatus to the second terminal apparatus; and
a transmitting section configured to transmit the measured first cross polarization discrimination to the base station apparatus.

6. The second terminal apparatus according to claim 5, wherein the cross polarization discrimination measuring section measures a second cross polarization discrimination between a third polarization of a signal transmitted from the second terminal apparatus to the base station apparatus and the second polarization of the signal transmitted from the base station apparatus to the second terminal apparatus.

7. A wireless communication method performed by a base station apparatus, comprising:
acquiring a first cross polarization discrimination between a first polarization of a signal transmitted from a first terminal apparatus to a second terminal apparatus and a second polarization of a signal transmitted from the base station apparatus to the second terminal apparatus; and
allocating, based on the first cross polarization discrimination, the second terminal apparatus to a first resource block that is included in an independent allocation band and that is allocated for one of a downlink and an uplink, the first resource block being adjacent to a second resource block that is included in a coordinated allocation band and that is allocated for the other one of the downlink and the uplink,
wherein the independent allocation band is a frequency band in which the first resource block is allocated independently from an adjacent cell and the coordinated allocation band is a frequency band in which the second resource block is allocated coordinately with the adjacent cell.

* * * * *